3,309,304
OZONE GENERATORS
Benjamin Caplan, 5519 Walnut St.,
Philadelphia, Pa. 19139
Filed Apr. 30, 1963, Ser. No. 276,871
3 Claims. (Cl. 204—313)

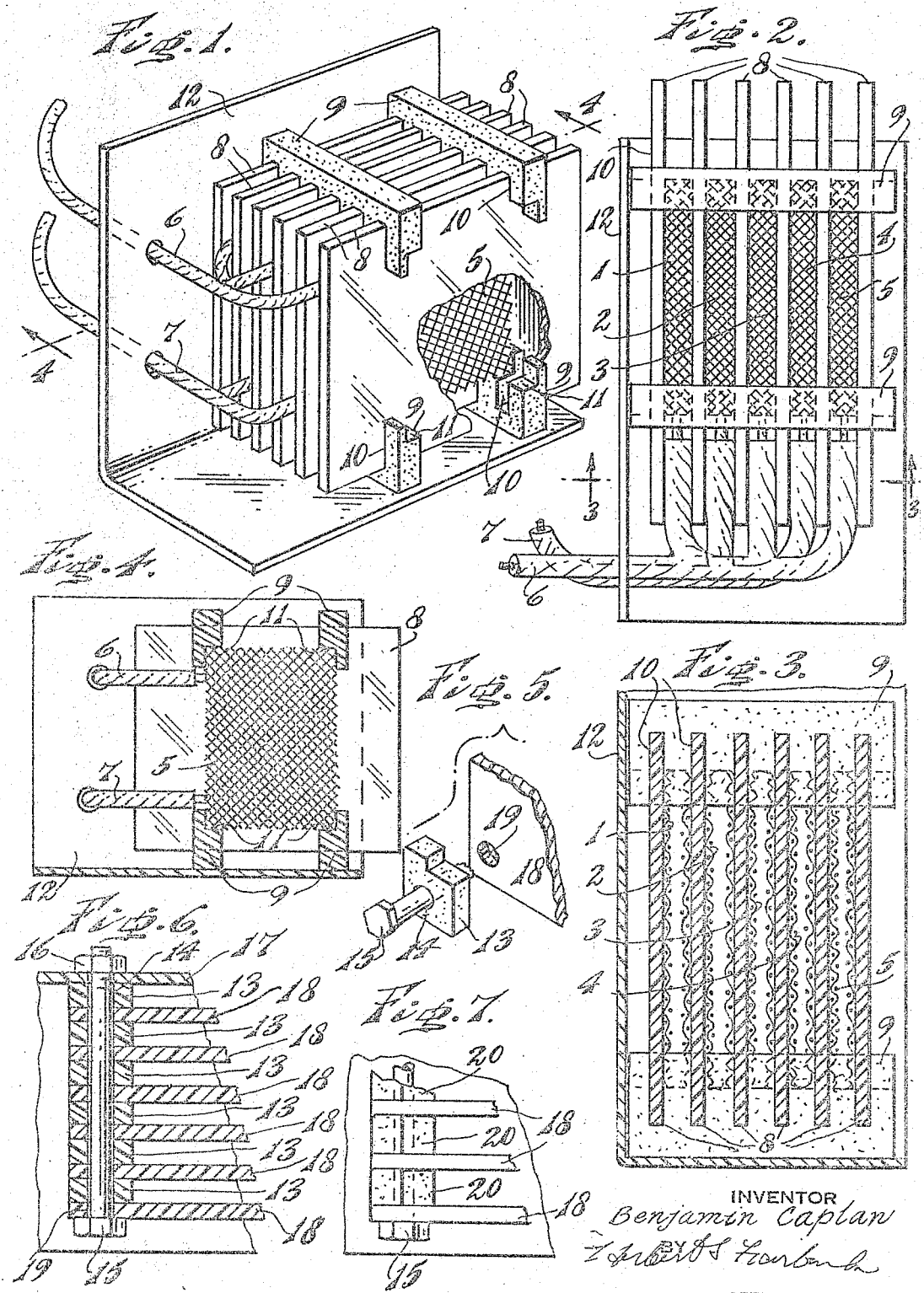

My invention relates to ozone generators of a kind suitable in a variety of concentrations for the purpose of air purification, destroying mold, fungi and bacteria and for the elimination of objectionable odors.

A further object of my invention is to construct a generator which will be free from destruction due to shock.

A further object of my invention is to construct a generator which can be used in vehicles such as trucks, trailers, box cars, etc. while stopped or in transit, or any compartment in a building or moving vehicle.

A further object of my invention is to construct a generator which can be used in vehicles for the purpose of air purification.

A further object of my invention is to prevent the contamination of food stuffs, such as meats, vegetables, fruits, etc. due to mold, bacteria, fungii, etc. while in transit.

A further object is to construct a generator of simple construction which can be easily removed and cleaned.

A further object is to construct an ozone generator composed of a series of stainless steel elements connected alternately to opposite poles, divided by a suitable dielectric such as glass, mica or plastic material.

A further object is to construct an ozone generator containing a flexible or solid holding device to hold the stainless steel elements and dielectric plates in constant relationship, thus controlling the air space between the element and the dielectric plates.

A further object is to control the air space, either increase or decrease the air space, thus controlling the intensity of the brush discharge to increase or decrease the volume of ozone generated.

A further object is to so construct an ozone generator as to allow for the increase or decrease of the voltage, current or frequency, and thereby control the increase or decrease of the volume of ozone emitted.

With the foregoing and other objects in view as will hereinafter more clearly appear, my invention comprehends a novel ozone generator.

For the purpose of illustrating the invention I have shown in the accompanying drawings, preferred embodiments of it, which I have found in practice to give satisfactory and reliable results. It is, however, to be understood that the various instrumentalities of which the invention consists can be variously arranged and organized, and the invention is not limited except by the scope of the appended claims to the exact arrangement and organization of there instrumentalities as herein set forth.

FIGURE 1 is a perspective view, partly broken away, of an ozone generator embodying my invention.

FIGURE 2 is a top plan view.

FIGURE 3 is a section on the line 3—3 of FIGURE 2.

FIGURE 4 is a longitudinal section on the line 4—4 of FIGURE 1, on a reduced scale.

FIGURE 5 is a fragmentary perspective view of another embodiment, showing the use of separate spacing blocks held together by a fastening means such as a bolt.

FIGURE 6 is a top section through the fastening means of FIGURE 5 showing the manner in which the blocks may be held in assembled condition.

FIGURE 7 is a top plan fragmentary view showing the use of wider spacing blocks to vary the air gap.

Similar numerals indicate corresponding parts.

Referring to the drawings:

The ozone generator is provided with five electrodes, 1, 2, 3, 4 and 5, in the form of stainless steel screens, said screens being connected alternately so that opposite poles are adjacent, as shown by leads 6 and 7.

The electrodes are separated by dividers 8, in the form of plates of dielectric material, such as glass, mica, or plastic, forming air gaps between the dividers.

The electrodes and dividers are maintained in assembled condition by means shown in the form of strips 9, preferably in the form of a high impact acrylic plastic. The strips 9 are provided with slots 10 to receive the dividers and are also provided with shoulders or shelves 11 to contact the electrodes and secure the electrodes in aligned position between the dividers. These strips 9 may be secured to an L shaped mounting 12, which may be of the same dielectric material, by adhesive or any desired means.

In the modified form shown in FIGURES 5, 6 and 7, the spacing means are in the form of L shaped spacing blocks 13, provided with apertures 14, adapted to receive fastening means, such as bolts 15, suitably of dielectric material, provided with nuts 16 and mounted in a suitable supporting plate 17. It will be understood that the dielectric separating plates 18 will be provided with apertures 19, to receive the bolts 15.

In FIGURE 7, I have shown the spacing blocks 20 of a larger width to provide a greater air gap.

Having thus described my invention, what I claim as new and desire to secure by Letters Patent is:

1. An ozone generator comprising rectangular stainless steel screens as electrodes, connected alternately to alternate poles of an alternating current source, dielectric material separating said electrodes as dividers between alternate electrodes and elongated transversely extending holding devices having teeth extending inwardly between adjacent dividers, said teeth being provided with opposed notches receiving the corners of said electrodes, whereby said dividers and electrodes are maintained in assembled position.

2. An ozone generator as defined in claim 1 wherein the holding devices consist of upper and lower strips extending transversely over the electrodes and dividers.

3. An ozone generator as defined in claim 1, wherein the holding devices consist of fastening means passing through the dividers and replaceable spacers between the dividers, whereby different size spacers may be employed to vary the air gap between the dividers.

References Cited by the Examiner
UNITED STATES PATENTS

| | | | |
|---|---|---|---|
| 1,218,817 | 3/1917 | Tennant | 204—313 |
| 1,539,419 | 5/1925 | Keiser | 204—313 |
| 3,198,726 | 8/1965 | Trikilis | 204—320 |

FOREIGN PATENTS

| | | |
|---|---|---|
| 606,906 | 8/1948 | Great Britain. |

JOHN H. MACK, *Primary Examiner.*

G. KAPLAN, *Assistant Examiner.*